Dec. 30, 1941.      B. F. W. HEYER      2,267,826
BATTERY TESTER AND METHOD OF TESTING
Filed Feb. 6, 1941      2 Sheets-Sheet 2
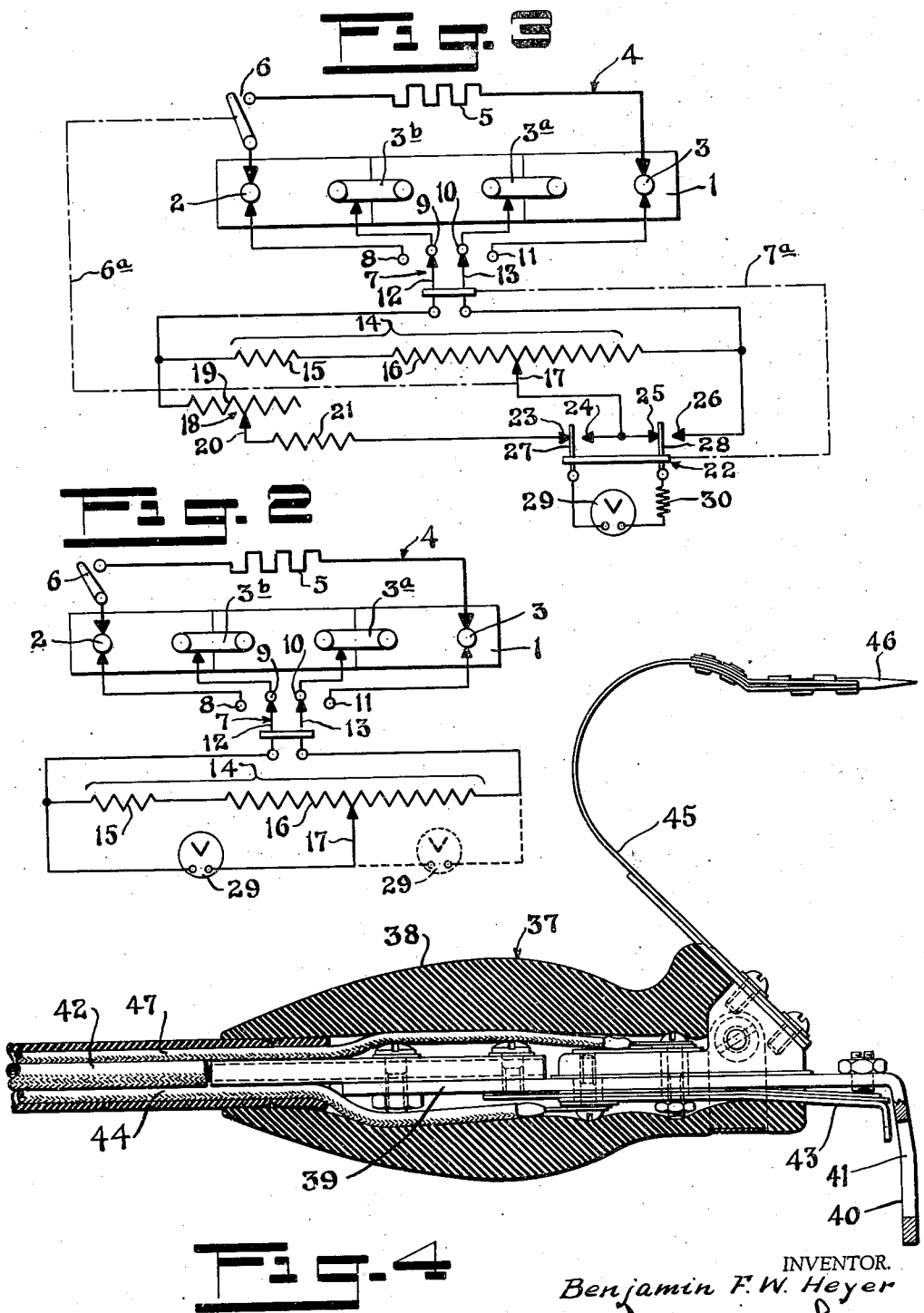
INVENTOR.
Benjamin F. W. Heyer Patented Dec. 30, 1941

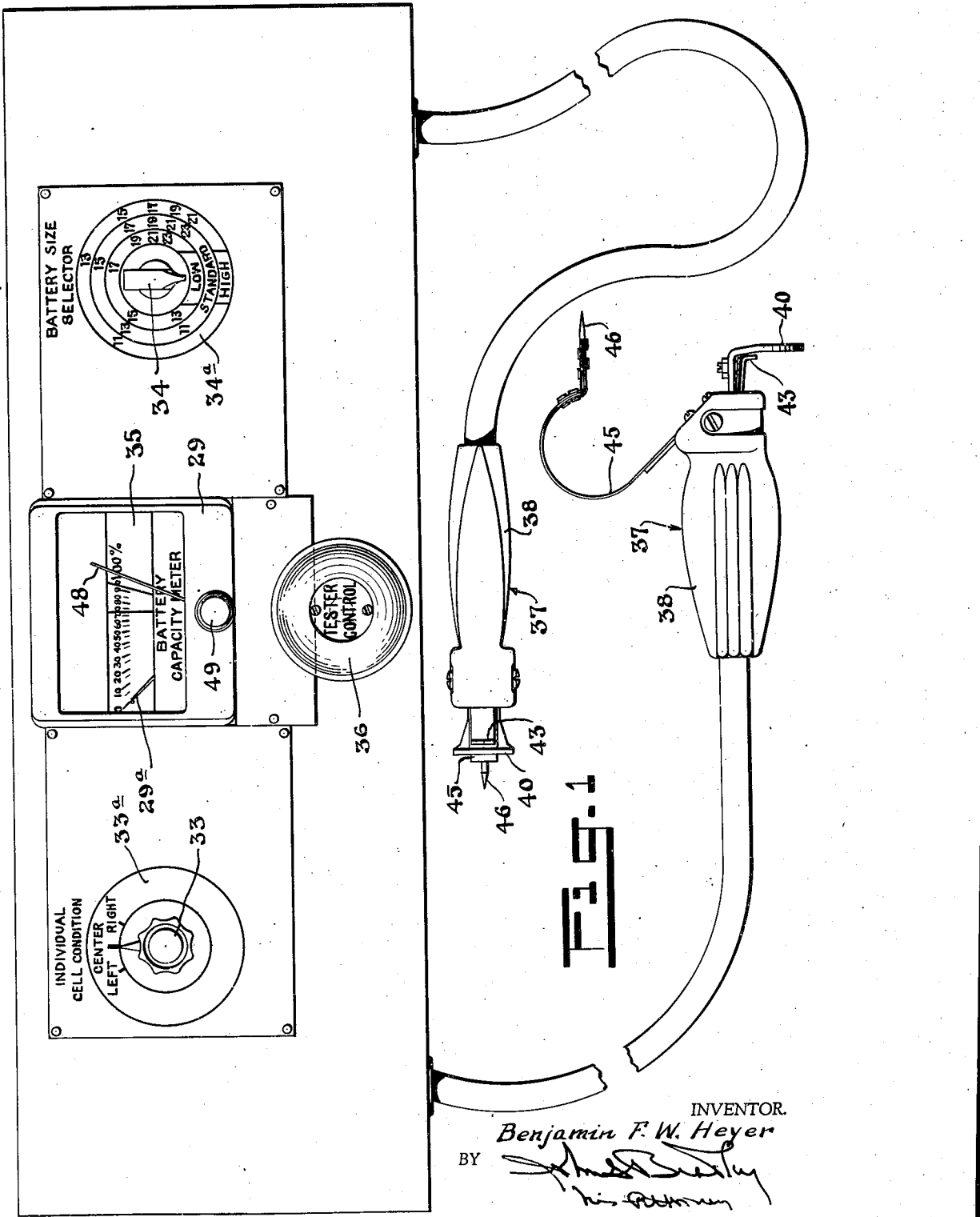

2,267,826

UNITED STATES PATENT OFFICE 2,267,826

BATTERY TESTER AND METHOD OF TESTING

Benjamin F. W. Heyer, Tenafly, N. J.

Application February 6, 1941, Serial No. 377,635

10 Claims. (Cl. 175—183)

All automobiles are now provided, as regular equipment, with a starter, headlights, tail lights, stop lights and instrument panel lights, and many with such additional accessories as a radio, cigar lighter, electric fan defroster, fog lights and other convenient gadgets. All of these things are operated electrically and entail a heavy drain upon the storage battery. This is particularly true of the starter which requires the sudden delivery of current from the battery of the value of, say, 180 amperes or more, and sometimes for a considerable period if the motor does not start easily.

In consequence, sudden battery failure has become a common occurrence, and every motorist is acutely aware that he may not realize that his starter is not functioning with its usual energy before it refuses to function at all as the result of battery failure. Therefore, the frequent testing of such storage batteries has become almost a routine matter, and all garages, service stations and filling stations should be equipped to conduct such tests.

Since this type of apparatus must be frequently used by men of little education or mechanical skill, it is essential that it be made extremely simple and positive in operation and indicate correctly the condition of each cell in a manner instantly and clearly understandable not only to the operator, but to the battery owner as well, since such owners are becoming increasingly reluctant to take the word of the operator that an expensive replacement is necessary or advisable.

Most of the available testing equipment is based upon the general principle that the internal condition of a battery is reflected by the internal resistance of each cell as indicated by the voltage drop across such cell when under load.

The present invention relates to battery testing equipment and methods of this same general type, but which is so easy to use that almost any one can make an accurate test. The condition of the battery is indicated by the position of the pointer of a single meter in a way that will be instantly and clearly evident and understandable, not only to the person making the test, but also to the battery owner.

The use of a percentage method in comparing one thing with another is simple, clear and graphic to everyone. This invention provides a battery tester which indicates the condition of a battery in percentage with a perfect fully-charged battery. Thus, when the test is made and the meter indicates 80%, the owner is made immediately aware that his battery has deteriorated by 20% as compared with its condition when new and fully charged.

A further advantage of great practical importance is that the tester can be produced at such low cost that it can be made available to filling stations as well as to larger garages and service stations, or the like.

As is well known most automobile storage batteries are composed of three cells in series having a normal open circuit voltage of something over six volts or approximately two volts per cell. Also, they are so designed that when fully charged and under the maximum load for which they are rated, the voltage will not drop below 1.8 volts per cell or 5.4 volts for the entire battery. A greater voltage drop in any one cell, beyond a certain point, as compared with any other cell indicates that that cell is defective and, in general, the seriousness of the defect is proportional to the magnitude of the voltage drop as compared with any other cell. For this reason, the condition of each cell can be learned comparatively from the voltage drop when the battery is under proper load.

However, the test is complicated by the fact that the internal resistance of batteries varies with the number of plates in each cell, or with the area of the plates. Thus, a large battery, for example, can deliver a given current with less voltage drop than a smaller one or a greater current can be delivered with the same voltage drop. Consequently, in the past when testing a battery, it has been considered necessary to place the battery under a certain rated operating load before determining the voltage drop across its individual cells. This has required an adjustable resistance in the load circuit capable of carrying a large current.

An adjustable carbon pile has been commonly employed for this purpose, as shown, for example, in my Letters Patent Nos. 1,520,865 and No. 2,084,086. Theoretically, the value of the current flowing in the load circuit can be adjusted by such a carbon pile to the desired value as indicated by an ammeter. However, as a practical matter, such adjustment is difficult to make because of the tendency of the pointer of the meter to over-swing. Also, the load circuit is somewhat unstable because as the temperature of the carbon pile rises, its resistance changes so that the operator must constantly watch the ammeter and readjust the carbon pile. Since the battery is under heavy load, this adjusting and readjusting may well take long enough to materially discharge the battery, so that the subsequent voltage drop test is deceptive. In some cases, tables giving the rating for the battery under test and the normal voltage drop under such load must be consulted. This is another fertile source of error, particularly in the hands of unskilled operators.

By the present invention the adjustable carbon pile resistance and ammeter have been supplanted by a resistance of fixed value which may be made of nichrome or other metal having a negligible temperature coefficient with respect to changes in resistance so that any battery which is connected to this tester will automatically be placed under a definite and constant load. In addition, an entirely separate voltmeter circuit is provided capable of indicating directly the percentage of difference in condition of each cell of the battery under test as compared to a perfect battery of corresponding size. This is done by means of a suitable voltmeter and in a manner which can be understood by the battery owner as easily and clearly as by the operator. All preliminary adjustments are made before the battery is put under load. Thus, the actual test can be performed quickly and accurately without reference to any tables or charts and there is no danger of discharging the battery to such a degree that the indicated results are unreliable.

A form of the invention selected for description herein is shown in the accompanying drawings, of which:

Figure 1 is a front elevation of the tester;

Figure 2 is a diagram for explanatory purposes showing an arrangement of electrical circuits which include a part of the invention;

Figure 3 is a complete diagram of circuits in which the invention is embodied; and Figure 4 is a sectional view of a means by which the required connections to the battery to be tested may be quickly and accurately made.

The invention can be described to best advantage with reference first to Figure 2. The battery to be tested is diagrammatically illustrated at 1 as consisting of three cells connected together in series by the usual straps. Between the terminals 2 and 3 of battery 1 is connected a main load circuit 4, which includes a resistance 5 preferably made of nichrome, or other metal having a negligible temperature co-efficient so that, irrespective of the length of time during which the current flows through the circuit 4, it will remain a definite, fixed value.

Theoretically, this should correspond to the maximum rating of the battery under test, but, since the ratings of batteries of different sizes are different, this is impossible, and, as a practical matter, unnecessary. It is suggested that the value of resistance 5 may be that which is suitable for a standard 15-plate battery since this is the most popular size. Probably 90% or more of all batteries in use are either 13, 15 or 17 plate. If the tester of this invention is designed for a 15-plate battery it will be found to be substantially as accurate for 13 and 17-plate batteries, and sufficiently accurate for the smaller and larger sizes which may occasionally be presented for test. A switch 6 is also included in the main load circuit 4, so that connection can be made to the battery terminals without starting the flow of current through the circuit.

Each cell of battery 1 is connected to a four point switch generally indicated as 7, the left cell being connected to contacts 8 and 9, the center cell to contacts 9 and 10, and the right cell to contacts 10 and 11. The switch is also provided with a pair of contact arms 12 and 13, so arranged that they move together and so that they will make contact with contacts 8 and 9, 9 and 10, or 10 and 11. These arms 12 and 13 are the terminals of a circuit which includes a potentiometer 14 consisting of a fixed resistance 15, a variable resistance 16, and contact arm 17. The resistance of potentiometer 14 is uniform per unit of length, and very high as compared with the resistance of main load circuit 4, so that the value of the current diverted from the main load circuit is negligible. For convenience, this circuit will be called "the potentiometer circuit."

As a simple explanation let it be assumed that in this circuit the voltage of each cell of the battery can be divided into two parts of any desired relative proportions. At the electrical mid-point of potentiometer 14, the voltage in each half would be the same and equal to half the voltage of the connected cell. If the cell were in perfect condition and fully charged, a meter connected across either half of potentiometer 14 would indicate .9 volt. This point on the meter scale could be marked 100%. Any other cell of the same battery or a cell of another battery of the same size, if perfect and fully charged, would cause the same meter deflection to the 100% mark.

However, if an under-charged or defective cell were substituted for the perfect cell, the load on the battery represented by fixed resistance 5 would cause its voltage to drop to a smaller value, and the voltage across each half of potentiometer 14 would be less. This would be represented on the meter by correspondingly lower readings. The readings could be re-established at the 100% point by swinging arm 17, say, to the left with the meter connected between this arm and the right end of the potentiometer, as shown in dotted line in Figure 2, to increase the resistance in that part of the potentiometer until the meter indicates 100%. Then the voltage across that part of the potentiometer would be .9 volt, or one-half the voltage of a perfect cell. If the voltmeter were now connected across the remaining part of the potentiometer 14, as indicated in full line in Figure 2, the voltage across that part would be found to be less than .9 volt because the total voltage is less than 1.8 and .9 volt have already been accounted for as above explained. Since the resistance of potentiometer 14 is uniform per unit of length, this voltage instead of being indicated in volts, could be shown on the meter scale as a percentage of 1.8 volts, or, in other words, as a percentage of the terminal voltage of a perfect fully-charged cell.

In other words, the reading would show directly the percentage of deficiency or under-charge. That the cell is defective by, say, twenty percent (20%) is something not only the operator, but the battery owner can instantly understand and appreciate, whereas the knowledge that the voltage of the cell is approximately 1.45 volts instead of 1.8 volts means absolutely nothing to the average battery owner and little to many of the service men. No clear picture of condition is immediately presented.

This illustrates the general underlying principle of this tester, i. e., if a fixed load is imposed upon the battery and the terminal voltage of each cell is divided into two parts, one of which is equal to half the terminal voltage of a perfect fully-charged cell of the same size, the other half will be equal to a definite percentage of the terminal voltage of a perfect fully-charged cell, which can be indicated directly upon the scale of a voltmeter.

Were batteries all of the same size, no additional apparatus would be required, but a complication is introduced by the fact that the tester must be capable of testing batteries of, say, from 135 to 300 ampere ratings, or, in other words, containing from eleven to twenty-three plates as well as of different plate areas. Of these there are commonly three, the plates of some batteries being smaller and some larger than the standard.

To enable the tester to give identical percentage meter indications of condition for these different batteries, requires a meter circuit somewhat more complex than the simple circuit assumed above. This will be called the "voltmeter circuit" and is shown in Figure 3, which, otherwise, is the same as Figure 2. The voltmeter circuit is connected to switch arms 12 and 13 and, consequently, across potentiometer 14. It includes a variable resistance 18 consisting of the resistance unit 19 and contact arm 20, a fixed resistance 21, a switch 22 having contacts 23, 24, 25 and 26, and parallel switch arms 27 and 28. A voltmeter 29 and multiplier 30 is connected to switch arms 27 and 28 and the contact arm 17 of potentiometer 14 is connected to contacts 24 and 25. By throwing switch arms 27 and 28 so that they make contact with contacts 23 and 25, the voltmeter is connected across that part of the potentiometer to the left of contact arm 17. Also variable resistance 18, and resistance 21 are included in the voltmeter circuit. Or, on the other hand, if switch arms 27 and 28 are thrown so as to engage contacts 24 and 26, the voltmeter is connected across that part of potentiometer circuit to the right of contact arm 17, and variable resistance 18 and resistance 21 are not included in the voltmeter circuit.

The purpose of variable resistance 18 is to compensate in the voltmeter circuit for the fact that all batteries tested, regardless of size, are under the same resistance load, determined by load resistance 5, so that the voltage across them are different even when they are in exactly the same condition. For example, assume that the battery under test is perfect, but is rated at less than the load imposed on it by load resistance 5, the voltage across each cell would be less than the standard 1.8 volts. However, if there is resistance in the meter circuit, the meter can be made to read 1.8 volts, by eliminating some of this resistance. On the other hand, if the battery under test has a higher rating than the load imposed by the load resistance 5, the voltage across each cell will be higher than 1.8 volts. In this case the meter can be made to read 1.8 by adding the proper amount of resistance to the voltmeter circuit. Consequently, the small battery and the large battery cell in the same condition can be made to produce the same deflection of the meter.

Specifically, by positioning arm 20 of variable resistance 18 at certain predetermined points on the resistance unit 19 so that more or less resistance is included in the voltmeter circuit of Figure 3, this factor of voltage variability can be compensated for so that it will have no effect upon the deflection of the meter. These settings of variable resistance 18 can be marked in terms of the number of plates and the size of the plates on a suitable dial associated with variable resistance 18, so that resistance 18 can immediately be set for the size of the battery under test. Because of its function of adapting the circuit for batteries of different sizes, it has been termed a "Battery size selector" in commercial testers embodying this invention.

The settings of variable resistance 18 can be determined by connecting a voltmeter in series with variable resistance 18 and fixed resistance 21 across a perfect, fully-charged cell of a battery which is also under load 5. If the voltage across the cell reads higher than 1.8, this reading can be brought down to 1.8 on the voltmeter by including more of resistance 18 in the voltmeter circuit, and this point can be marked with the size of the battery. Similarly, another perfect fully-charged battery of a different size can be substituted and the voltmeter again made to register 1.8 by means of variable resistance 18 and the point marked with the size of that battery. In this way resistance 18 can be calibrated for all sizes within the range of the tester and the points at which its arm 20 is to be set for each size, definitely indicated upon a dial associated with the resistance.

To test a battery by means of this apparatus, the six connections to the battery shown in Figure 3 are first made. This will place the load 5 across the entire battery when switch 6 is closed and also provides for the connection of each cell of the battery to the potentiometer and voltmeter circuits through the agency of switch 7. In Figure 3 the middle cell is connected. Let it also be assumed that contact arm 17 is so positioned that it does not engage with potentiometer resistance 16 and that switch arms 27 and 28 are in contact with contacts 23 and 25.

The next step is to position the arm 20 of variable resistance 18 at the indicated point on resistance unit 19 for the size of battery under test. It will be noted that the battery is not yet under load and no current is flowing in either the potentiometer or voltmeter circuits.

The switch 6 may now be closed, which imposes the load upon the battery and potentiometer contact arm 17 moved so that it engages potentiometer resistance 16. The pointer of voltmeter 29 will then rise and, as arm 17 is adjusted on resistance 16, may be made to indicate 100%. This means that the voltage across the voltmeter is .9 volt. The voltage across that part of the potentiometer 14 to the left of arm 17 is greater than .9 volt by the amount of voltage absorbed by resistances 18 and 21.

The actual test is now performed by swinging contact arms 27 and 28 of switch 22 so that they engage with contacts 24 and 26, which bridges voltmeter 29 across the other part of potentiometer 14 to the right of the position of contact arm 17. The voltmeter will indicate the actual voltage across this part of the potentiometer which, of course, is equal to the remaining voltage of the cell, and, as already explained, this indication may be expressed in percentage instead of in actual voltage.

If the cell is perfect and fully charged, this voltage will be .9 volt and the meter will indicate 100%. If the cell is defective or undercharged, the meter indication will be lower and, as already explained, can be expressed in a percentage of what the voltage across the cell would be if it were perfect and fully charged.

In other words, to make the meter indicate .9 volt or 100% the voltage across the left part of potentiometer 14 must be altered sufficiently to compensate for the effect of resistances 18 and 21. This subtracts from or adds to the voltage across this part of potentiometer an amount equal to the difference between the actual voltage across the cell and its correct voltage of 1.8 volts when under its rated load. It also adds or subtracts an equivalent amount of the voltage across the other part of potentiometer 14 to the right of arm 17 so that the voltage across this part can be measured directly by the voltmeter just as though the battery were, in fact, discharging at its rated load.

The other cells may be connected to the potentiometer and voltmeter circuits by throwing switch 7 to close the indicated contacts and then tested by repeating the described procedure. If the meter indication for each of the cells is not less than 90%, the battery may be assumed to be in good conditon; if the indications are between 90 and 70%, the condition of the battery may be assumed to be from fairly good to rather poor, but still usable. If the indication for any cell is below 70%, the probabilities are that the cell is defective and the battery should be replaced. However, if the meter indications for all of the cells are low, but substantially the same the battery may be undercharged instead of defective, and it should be fully charged and tested again before any decision as to its condition is reached.

To facilitate the reading of the meter still further, its scale below 70% may be colored red. The area between 70 and 90% yellow, and the area above 90% green. In this way the three areas indicating "good," "fair" and "poor" may be sharply defined and the general condition of each cell can be noted without even reading the percentage scale.

To assist in comparing the indication of one cell of the battery with that of another, the meter may also be provided with a second pointer 48, which can be swung manually across the scale by a knob 49. When the first cell is tested, the pointer 48 may be set to correspond with the resulting meter indication and will assist in noting the difference between this indication and those for the other two cells.

It has been assumed in the preceding explanations that the terminal voltage of the battery has been so divided that one part equals .9 volt plus or minus, respectively, any excess or deficiency of the actual terminal voltage above or below the rated terminal voltage of 1.8 volts. In consequence, the other part would actually be .9 volt if the battery is perfect and fully-charged. However, it will be evident that any fraction of the rated terminal voltage may be combined with the excess or deficiency of the actual terminal voltage above or below the rated terminal voltage of 1.8 volts, and that the remainder of the terminal voltage can be shown directly on the meter as a percentage of the rated terminal voltage. The manner in which the terminal voltage is divided depends largely upon the electrical characteristics of the circuits and of the meter, it being desirable, although not essential, to obtain as great a deflection as possible of the pointer of the meter when measuring the second part of the terminal voltage, or, in other words, when making the actual test.

The underlying principle of this tester can now be restated as follows: If the battery is placed under a fixed load and the voltage between the terminals of a cell is divided into two parts, one of which is equal to a certain percentage of the rated terminal voltage plus any excess of the actual terminal voltage of the cell over 1.8 volts, or minus any deficiency in the actual terminal voltage of the cell below 1.8 volts, then the other part will be the remaining fraction of the actual terminal voltage, which can be expressed as a percentage of 1.8 volts, i. e., as a percentage of the rated terminal voltage of the cell under its rated load.

Since a small difference in voltage indicates a decided difference in condition, it is desirable that the voltmeter be relatively sensitive to voltage differences when the actual test is made, whereas it may be comparatively insensitive for the preliminary adjustment. This is made possible by including resistance or multiplier 21 in series with variable resistance 18 and giving it a value much larger than that of the multiplier 30.

Then, when the voltmeter is bridged across the left part of the potentiometer circuit shown in Figure 3 so that resistance 21 and a part of resistance 18, depending upon the size of the cell under test, are included, the meter is, comparatively speaking, a high resistance meter with the characteristic that a given change in the voltage imposed upon it will produce a comparatively small change in its indication. Obviously, to bring its pointer to the 100% mark, much less of potentiometer resistance 16 would be permissible, and arm 17 would be positioned nearer the initial end of this resistance. When the voltmeter is switched across the other part of the potentiometer circuit so that the resistances 18 and 21 are excluded, the voltmeter becomes a comparatively low resistance meter and more responsive to small changes in the resistance of the circuit.

Resistance 15 serves a similar purpose in the potentiometer circuit by reducing the required range of resistance 16. In consequence, a given movement of contact arm 17 along resistance 16 will produce a smaller change in the resistance of the circuit than would otherwise be the case. This feature is of great practical importance since it permits the making of sensitive adjustments with ease and accuracy.

The electrical value of the resistance and other devices described above may be varied between rather wide limits according to the preference of the designer, and can be determined by those skilled in the art in the light of the above description. It has already been explained that the resistance of the potentiometer circuit should be much greater than that of the main load circuit and the same is true of the voltmeter circuit as compared with the potentiometer circuit for the same reason.

The device described above may be mounted behind a panel such as that shown in Figure 1. In this arrangement a knob 33 operates switch arms 12 and 13 to connect the left center or right cell of the battery to the potentiometer circuit and voltmeter circuits. In the position shown and with the pointer pointing to "Center" on the dial 33a, the middle cell is connected as shown in Figure 3. Switch 7 may also be combined with switch 22 so that knob 33 can also be used to switch the voltmeter across one part or the other of the potentiometer circuit, as indicated by the broken line in Figure 3. Preferably the two switches are so connected that, normally, the two contact arms of switch 22 will be in contact with contacts 23 and 25, as shown in Figure 3, so that knob 33 can be turned to connect any one of the three cells of the battery into the potentiometer circuit without disturbing this condition. Then, by simply pushing knob 33 towards the panel, switch 22 is shifted to its other position in which contact is made with contacts 24 and 26.

Another knob 34 is mounted on the shaft of contact arm 20 of variable resistance 18 so that by turning this knob, the value of resistance unit 19 can be altered as required for battery cells of different sizes. The position of knob 34 for each size of battery may be indicated by a dial 34a, consisting of three concentric rings for batteries having small, standard, or large size plates, each ring being numbered to indicate the number of plates per cell. For example, if the pointer of knob 34 is turned to point to 15 on the dial ring marked "Standard," the resistance 18 will then be properly set for the testing of a standard 15 plate battery.

The dial 35 of voltmeter 29 is also observable through an opening in the panel and may be marked in percentage, as shown, instead of volts.

Below the meter 29 is shown another large knob 36, which may serve the dual purpose of controlling the main load circuit switch 6 and potentiometer contact arm 17, as indicated by the dotted line 6a in Figure 3. When this knob is turned to its extreme counter-clockwise position, switch 6 is open, as shown in Figure 3, and potentiometer arm 17 is also out of contact with potentiometer resistance 16, so that the potentiometer and voltmeter circuits are also open. By turning knob 36 in clockwise direction, potentiometer arm 17 is brought into contact with the end of potentiometer resistance 16. A slight additional turn closes switch 6 to complete the main load circuit and further turning moves contact arm 17 along potentiometer resistance 16. In this way the number of control knobs is reduced to three. The various switches may, if desired, be separately controlled, but the combining of controls in this way greatly simplifies the panel and reduces the likelihood of error in making the necessary adjustments.

The making of the six required connections to one battery may be greatly facilitated by using the clips 37 shown in Figures 1 and 4. They are similar, so that only one will be described. It consists essentially of a handle 38 of rubber, or other insulating material, within which is secured in any desired way a contact member 39 terminating in an offset end 40 projecting beyond the handle and having an opening 41 somewhat larger than the terminal post of a storage battery. A heavy wire or cable 42 capable of carrying the main load current with ease is connected to contact member 39 and runs to one end of main load resistance 5 (see Figure 3). On contact member 39, but insulated therefrom, is also mounted another contact member 43, one end of which also projects beyond the end of contact member 39 and slightly beyond the edge of opening 41. Contact member 43 is also connected to a wire 44 which, as shown in Figure 3, runs to contact 11 of switch 7. Also mounted on contact member 39 and also insulated therefrom is a third U-shaped contact member 45 made of highly resilient metal, terminating in a sharp point 46, which as shown in Figure 3 is connected to contact 10 of switch 7 by wire 47.

The connection to the battery by means of this clip is made by forcing point 46 of contact member 45 into strap 3a of the battery and then passing terminal post 3 of the battery through opening 41 of contact member 39. The resilience of contact member 45 will cause the clip to tilt so that post 3 of battery will be jammed between the edge of opening 41 and the end of contact member 43. By this simple operation the three requisite connections to the battery are made.

The other clip 37 is similar and is applied to terminal 2 and strap 3b of the battery in the same way to make connection between battery terminal 2 and the other end of main load resistance 5, and also between terminal 2 and contact 8 of switch 7 and strap 3b and contact 9 of switch 7. In standard commercial batteries the positive post is always a little larger than the negative post. Therefore, the opening 41 in contact member 39 of the clip by which the tester is connected to the negative post of the battery should, preferably, be a little smaller than the similar opening of the other clip so that it cannot pass over the positive post. In this way reversal of the connections to the battery is made impossible.

With the tester arranged as above described, the testing of the battery becomes a very simple matter. The operator first connects the tester to the battery by means of the two clips 37. Having ascertained that the battery is, say, a standard 15-plate battery, he turns the knob 34 so that it points to 15 on the middle ring marked "Standard" of dial 34a. He then turns knob 33, say, to the point marked "Left," which connects the left cell of the battery to the potentiometer circuit. The tester control knob 36,—which it will be assumed is in its extreme counter-clockwise position,—is then turned in clockwise direction, which first causes potentiometer arm 17 to engage with potentiometer resistance 16, and then closes the main load circuit switch 6. The pointer 29a of meter 29 will begin to move from its zero position and the operator will continue to turn the tester control knob 36 until the pointer rests at the mark indicating 100%. Then knob 33 is pressed and the meter will indicate the percentage of deficiency or undercharge of the cell. The middle cell can then be tested by turning knob 33 to the "Center" position and repeating the operations outlined above. The right cell can also be tested in a similar manner.

The operation of this tester is not only extremely simple, but the indicated results are reliable and immediately understandable by anyone. No reference to tables giving the rated load for batteries of different sizes or other information is required. The only extraneous information necessary is the size of the battery, and this is usually marked upon the battery itself. Because of these features the danger of reaching incorrect conclusions from the test is substantially eliminated. Furthermore, the tester is well adapted to quantity production at low cost and its upkeep is negligible. Consequently, it makes battery testing service available at many garages and service stations whose limited battery business has not heretofore justified the outlay for adequate equipment.

I claim:

1. A device for testing storage batteries of the same rated voltages but of different rated ampere capacities, which includes a load circuit having a fixed resistance connectible across the battery, means for segregating a part of the terminal voltage of any cell when the battery is discharging through said load circuit equal to a definite part of its rated terminal voltage plus or minus respectively any excess or deficiency of its terminal voltage in relation to its rated voltage, and means for determining the value of the remaining part of the terminal voltage of said cell as a percentage of the rated voltage of the cell.

2. A device for testing storage batteries of the same rated voltage but of different rated ampere capacities, which includes a load circuit having a fixed resistance value connectible across the battery, a circuit including a potentiometer or voltage divider connectible across any cell of the battery, a contact arm adapted to make contact with any point of said potentiometer, a circuit containing a voltmeter and a variable resistance in series, means for connecting said voltmeter and said variable resistance to said contact arm and to one end of said potentiometer, and for connecting said voltmeter without said variable resistance to said arm and to the other end of said potentiometer.

3. A device for testing storage batteries as defined in claim 2, in which the resistance of the potentiometer circuit is much higher than the resistance of the load circuit and the resistance of the voltmeter circuit is much higher than the resistance of the potentiometer circuit.

4. A device for testing storage batteries of the same rated voltages but of different rated ampere capacities, which includes a load circuit having a fixed resistance value connectible between the positive and negative terminals of the battery, four contact points, a clip for connecting the load circuit and a first of the contact points to the positive terminal of the battery and also for connecting a second of the contact points to the negative terminal of the same cell and the positive terminal of the next cell, another clip for connecting a third of the contact points to the negative terminal of said next cell and the positive terminal of the third cell and also for connecting a fourth of the contact points and the load circuit to the negative terminal of the battery, a circuit including a potentiometer, a switch in said potentiometer circuit adapted to simultaneously connect said first and second, second and third, and third and fourth contact points, respectively, to the opposite ends of said potentiometer, a contact arm adapted to make contact with any point of said potentiometer, a circuit containing a voltmeter and a variable resistance in series, means for connecting said voltmeter and said variable resistance to said contact arm and to one end of said potentiometer and for connecting said voltmeter alone to said contact arm and to the other end of said potentiometer.

5. A device for testing storage batteries as defined in claim 4, which includes a switch in the load circuit operable by the means which operates said contact arm and in which the means for operating the switch in the potentiometer circuit is the same as the means for connecting the voltmeter between said contact arm and the respective ends of said potentiometer.

6. The method of testing batteries of the same rated voltages but of different rated ampere capacities, which consists of applying a load of fixed resistance value across the battery, dividing the voltage of a cell of the battery into two parts, one of which is equal to half the rated voltage of the cell plus or minus, respectively, any excess or deficiency of the terminal voltage of the cell in relation to its rated voltage and then determining the value of the other part of the terminal voltage of the cell as a percentage of its rated terminal voltage when under its rated load.

7. The method of testing the cells of storage batteries of the same rated voltages but of different rated ampere capacities, which consists of applying a load of fixed resistance value across the battery, dividing the terminal voltage of a cell of said battery into two parts, one of which is equal to .9 volt plus any excess of the terminal voltage of the cell over 1.8 volts, or minus any deficiency of the terminal voltage of the cell below 1.8 volts, and then determining the value of the remaining part of the terminal voltage of the cell as a percentage of 1.8 volts.

8. The method of testing storage batteries having a rated voltage under rated load of 1.8 volts per cell, which consists of placing the battery under a load of fixed resistance value, then dividing the terminal voltage of the cell into two parts, one of which is equal to .9 volt plus or minus, respectively, any excess or deficiency of the terminal voltage of the cell in relation to its rated voltage and then determining the voltage of the other part as a percentage of 1.8 volts.

9. The method of testing storage batteries of the same rated voltages but of different rated ampere capacities, which consists of applying a load of fixed resistance value across the battery, dividing the terminal voltage of a cell of said battery into two parts, one of which is equal to a known percentage of the rated terminal voltage of the cell plus or minus, respectively, any excess or deficiency of the terminal voltage of the cell above or below its rated terminal voltage and then determining the value of the remaining part of the terminal voltage of the cell as a percentage of the rated terminal voltage of the cell.

10. The method of testing storage batteries having a rated voltage under rated load of 1.8 volts per cell, which consists of placing the battery under a load of fixed resistance value, then dividing the terminal voltage of a cell into two parts, one of which is equal to a known percentage of 1.8 volts plus or minus, respectively, any excess or deficiency of the actual terminal voltage of the cell in relation to its rated terminal voltage and then determining the voltage of the other part as a percentage of 1.8 volts.

BENJAMIN F. W. HEYER.